United States Patent
Oba et al.

(10) Patent No.: US 11,067,967 B2
(45) Date of Patent: Jul. 20, 2021

(54) CONTROL APPARATUS AND CONTROL METHOD

(71) Applicant: OMRON Corporation, Kyoto (JP)

(72) Inventors: Hitoshi Oba, Kameoka (JP); Minoru Takahashi, Otsu (JP)

(73) Assignee: OMRON Corporation, Kyoto (JP)

( * ) Notice: Subject to any disclaimer, the term of this patent is extended or adjusted under 35 U.S.C. 154(b) by 358 days.

(21) Appl. No.: 16/159,730

(22) Filed: Oct. 15, 2018

(65) Prior Publication Data

US 2019/0235476 A1 Aug. 1, 2019

(30) Foreign Application Priority Data

Jan. 31, 2018 (JP) .............................. JP2018-015826

(51) Int. Cl.
*G05B 19/4155* (2006.01)
*G01D 9/28* (2006.01)

(52) U.S. Cl.
CPC ......... *G05B 19/4155* (2013.01); *G01D 9/285* (2013.01); *G05B 2219/34206* (2013.01)

(58) Field of Classification Search
CPC .............. G05B 19/4155; G05B 19/054; G05B 2219/34206; G05B 2219/15078; G01D 9/285
See application file for complete search history.

(56) References Cited

U.S. PATENT DOCUMENTS

| 2008/0255723 | A1 | 10/2008 | Sano | |
|---|---|---|---|---|
| 2011/0290018 | A1* | 12/2011 | Jeftic-Stojanovski | ........... 73/493 |
| 2013/0110354 | A1* | 5/2013 | Kiribayashi | ............ G01P 1/127 701/45 |

FOREIGN PATENT DOCUMENTS

| DE | 19603942 | 8/1997 |
|---|---|---|
| JP | 2001012974 | 1/2001 |
| JP | 2001033562 | 2/2001 |
| JP | 2001158384 | 6/2001 |
| JP | 2013095219 | 5/2013 |
| JP | 2016-003998 | 1/2016 |

OTHER PUBLICATIONS

"Search Report of Europe Counterpart Application", dated Mar. 29, 2019, p. 1-6.
Office Action of Japan Counterpart Application, with English translation thereof, dated Mar. 9, 2021, pp. 1-10.

* cited by examiner

*Primary Examiner* — Tarun Sinha
*Assistant Examiner* — Lal C Mang
(74) *Attorney, Agent, or Firm* — JCIPRNET (57) ABSTRACT

In the embodiments of the disclosure, a target signal which is a signal of a part used for subsequent processing is acquired from signals output from a device with higher accuracy. A control apparatus includes a first acquisition part which acquires a first signal of a time series output from a first device, a recording part which records a part of the first signal acquired by the first acquisition part, and a determination part which determines a timing at which the recording part records the first signal based on a preset predetermined condition.

3 Claims, 8 Drawing Sheets

CONTROL APPARATUS AND CONTROL METHOD

CROSS-REFERENCE TO RELATED APPLICATION

This application claims the priority benefit of Japan application serial no. 2018-015826, filed on Jan. 31, 2018. The entirety of the above-mentioned patent application is hereby incorporated by reference herein and made a part of this specification.

BACKGROUND

Technical Field

The disclosure relates to a control apparatus and a control method.

Description of Related Art

Apparatuses that perform various processes by using time series signals output from devices such as sensors and motors have been proposed. For example, Patent Document 1 (Japanese Laid-open No. 2016-003998) discloses an apparatus that detects alcohol concentration by comparing a reference value that varies according to the acquisition timing of a sensor output value with an actual measured value.

When such processing is performed, it is necessary to acquire a signal (hereinafter, referred to as a "target signal") of a time interval used for actual processing from the time series signals output from a device such as a sensor and a motor. In some cases, the accuracy of subsequent processing may change depending on the timing at which the signal is acquired as the target signal from the signals continuously output from the device.

SUMMARY

According to one aspect of the disclosure, a control apparatus includes a first acquisition part, a recording part, and a determination part. The first acquisition part acquires a first signal of a time series output from a first device. The recording part records a part of the first signal acquired by the first acquisition part. The determination part determines a timing at which the recording part records the first signal based on a preset predetermined condition.

According to one aspect of the disclosure, a control method includes a first acquisition step of acquiring a first signal of a time series output from a first device, a determination step of determining a timing of recording the first signal based on a preset predetermined condition, and a recording step of recording a part of the first signal acquired in the first acquisition step according to the timing determined in the determination step.

DESCRIPTION OF THE EMBODIMENTS

The disclosure has been made in view of the above points and aims to provide a control apparatus and a control method capable of acquiring a target signal which is a signal of a time interval used for subsequent processing from time series signals output from a device with higher accuracy.

According to one aspect of the disclosure, in the above control apparatus, the determination part determines a timing at which the recording part starts recording the first signal based on a timing at which a value of the first signal acquired by the first acquisition part exceeds a predetermined threshold value.

According to one aspect of the disclosure, the above control apparatus further includes a second acquisition part acquiring a second signal output from a second device different from the first device. The determination part determines a timing at which the recording part starts recording the first signal based on the second signal acquired by the second acquisition part.

According to one aspect of the disclosure, in the above control apparatus, the determination part determines the timing at which the recording part starts recording the first signal based on a timing at which the first signal satisfies another predetermined condition after the second signal acquired by the second acquisition part satisfies a predetermined condition.

According to the disclosure, it is possible to acquire a target signal which is a signal of a time interval used for processing from time series signals output from a device with higher accuracy.

Figure 1:
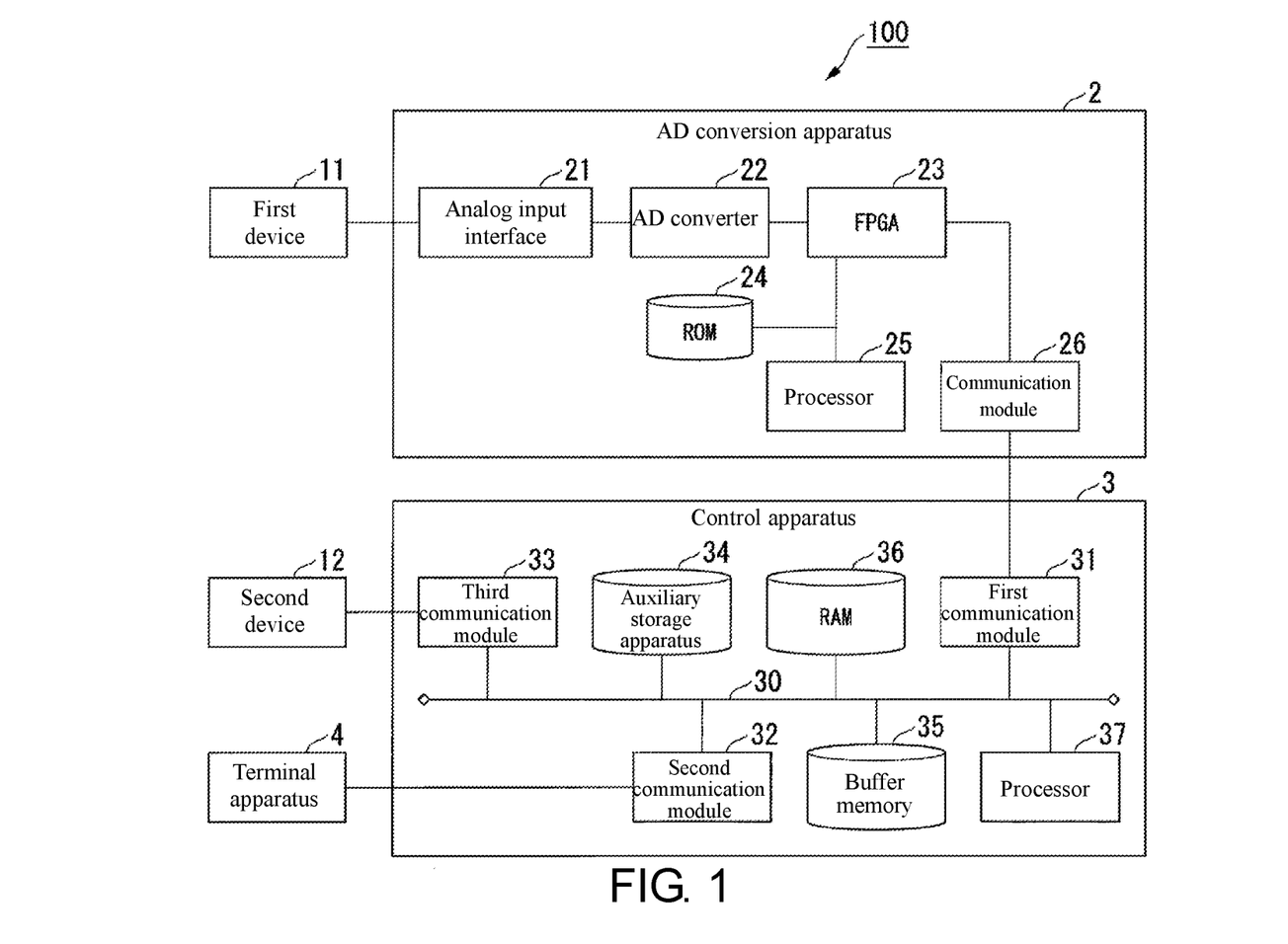
FIG. 1 is a diagram showing a specific example of a configuration of a control system 100.

FIG. 1 is a diagram showing a specific example of a configuration of a control system 100. The control system 100 includes a first device 11, a second device 12, an AD conversion apparatus 2, a control apparatus 3, and a terminal apparatus 4.

The first device 11 is an input device such as a temperature sensor or a pressure sensor, or an output device such as a servo motor. If the first device 11 is an input device, the first device 11 outputs a value obtained as a result of sensing. If the first device 11 is an output device, the first device 11 outputs a value indicating the content of an operation, the state after the operation, etc. The first device 11 is connected to the AD conversion apparatus 2. The first device 11 outputs an electric signal indicating an analog value to the AD conversion apparatus 2.

The second device 12 is an input device such as a temperature sensor or a pressure sensor, or an output device such as a servo motor. The second device 12 is configured as a device different from the first device 11. For example, if the first device 11 is a distance sensor used for measuring the surface shape of an object under measurement (hereinafter, referred to as "target object"), the second device 12 may be a detection device for detecting the position of the target object that is to be conveyed. For example, if the first device 11 is a temperature sensor used for measuring the temperature of a space under measurement (hereinafter, referred to as "target space"), the second device 12 may be a device for measuring the illuminance of the target space or a device for detecting a person existing in the target space. For example, if the first device 11 is a drive device of a conveyor for conveying an object to be conveyed (hereinafter, referred to as "conveyance body"), the second device 12 may be a detection device for detecting the position of the conveyed object. Thus, the second device 12 is a device that senses or acts on a target sensed or acted on by the first device 11, or a target related thereto.

The AD conversion apparatus 2 is connected to the first device 11 and inputs a time series analog signal output from the first device 11 to the apparatus itself. The AD conversion apparatus 2 converts the analog signal into a digital signal and outputs the converted digital signal to the control apparatus 3.

The control apparatus 3 is configured by using an information processing apparatus. The control apparatus 3 is, for example, a PLC (programmable logic controller). The control apparatus 3 is connected to the AD conversion apparatus 2 and inputs time series digital signals sequentially output from the AD conversion apparatus 2 to the apparatus itself. The control apparatus 3 starts a recording operation of the digital signals output from the AD conversion apparatus 2 when a predetermined condition (a recording start condition) is satisfied. The control apparatus 3 ends the recording operation of the digital signals output from the AD conversion apparatus 2 when a predetermined condition (a recording end condition) is satisfied. The control apparatus 3 records in an internal memory the information indicating the digital signals input from the start to the end of the recording operation.

The terminal apparatus 4 is an information processing apparatus such as a PC (personal computer) or a workstation, a smartphone, a mobile phone, a tablet terminal, etc. The terminal apparatus 4 is configured to be able to communicate with the control apparatus 3. The terminal apparatus 4 is used for a user of the control system 100 to input various operations to the control apparatus 3.

Next, the configurations of the AD conversion apparatus 2 and the control apparatus 3 will be described in detail. First, the hardware configuration of each apparatus will be described with reference to FIG. 1.

First, the hardware configuration of the AD conversion apparatus 2 will be described. The AD conversion apparatus 2 includes an analog input interface 21, an AD converter 22, an FPGA (field programmable gate array) 23, a ROM (read only memory) 24, a processor 25, and a communication module 26.

The analog input interface 21 is an input interface for analog signals. The analog input interface 21 connects the first device 11 and the AD conversion apparatus 2 and inputs the time series analog signals output from the first device 11 to the AD conversion apparatus 2.

The AD converter 22 converts the analog signal input via the analog input interface 21 into a digital signal. Specifically, the AD converter 22 samples the analog signal in a sampling cycle of about several microseconds and converts the sampled analog signal into a digital signal by quantizing it at a predetermined quantization level.

The FPGA 23 is a circuit that performs arithmetic processing on the digital signal converted by the AD converter 22. Specific examples of arithmetic processing include digital filter processing, offset/span setting processing, etc. Specific examples of digital filter processing include processing of smoothing using low pass filter or moving average. The digital signal that has undergone the arithmetic processing is transmitted to the control apparatus 3 via the communication module 26.

Specifically, the AD conversion apparatus 2 stores configuration data for configuring the FPGA 23 as a circuit that performs arithmetic processing in the ROM 24 in advance. The FPGA 23 acquires from the processor 25 the configuration data read from the ROM 24 at the time of activation of the AD conversion apparatus 2 and performs configuration processing (generally referred to as configuration) of a logic circuit based on the acquired configuration data to thereby configure itself as a circuit that performs arithmetic processing.

The communication module 26 is a communication interface for the AD conversion apparatus 2 to communicate with the control apparatus 3. The communication module 26 is connected to a first communication module 31 of the control apparatus 3 and transmits the digital signal that has undergone arithmetic processing performed by the FPGA 23 to the control apparatus 3.

Next, the hardware configuration of the control apparatus 3 will be described. The control apparatus 3 includes the first communication module 31, a second communication module 32, a third communication module 33, an auxiliary storage apparatus 34, a buffer memory 35, a RAM (random access memory) 36, and a processor 37 connected by an internal bus 30.

The first communication module 31 is a communication interface for the control apparatus 3 to communicate with the AD conversion apparatus 2. The first communication module 31 is connected to the communication module 26 of the AD conversion apparatus 2 and receives the digital signal transmitted from the AD conversion apparatus 2. The digital signal received by the first communication module 31 is stored in the buffer memory 35.

The second communication module 32 is a communication interface for the control apparatus 3 to communicate with the terminal apparatus 4. The second communication module 32 is connected to a communication interface of the terminal apparatus 4 and performs transmission and reception of various information with the terminal apparatus 4.

The third communication module 33 is a communication interface for the control apparatus 3 to communicate with the second device 12. The third communication module 33 is connected to a communication interface of the second device 12 and receives a signal transmitted from the second device 12. The signal received by the third communication module 33 is a signal converted into a digital signal by the second device 12 or an AD conversion apparatus (not shown). The third communication module 33 may be an interface of a network such as EtherCAT (registered trademark), for example.

The auxiliary storage apparatus 34 is configured by using a storage apparatus such as a magnetic hard disk apparatus or a semiconductor storage apparatus. The auxiliary storage apparatus 34 stores various setting information necessary for the operation of the control apparatus 3 or various information acquired or generated in the control apparatus 3.

The buffer memory 35 stores values of the digital signals received by the first communication module 31 from the AD conversion apparatus 2. The buffer memory 35 repeatedly executes storing and erasing of digital signal values at a predetermined operation cycle. By accessing the buffer memory 35 in synchronization with the operation cycle, the processor 37 can read the digital signal values stored in the buffer memory 35 and record them in the RAM 36.

The RAM 36 and the processor 37 execute various processes for realizing the recording operation of the control apparatus 3. More specifically, the processor 37 reads the program stored in the auxiliary storage apparatus 34 into the RAM 36 and executes the program. By executing the program, the control apparatus 3 functions as an apparatus having the functional configuration shown in FIG. 2 and performs the recording operation on the digital signal value by the operation of each functional part shown in FIG. 2.

Figure 2:
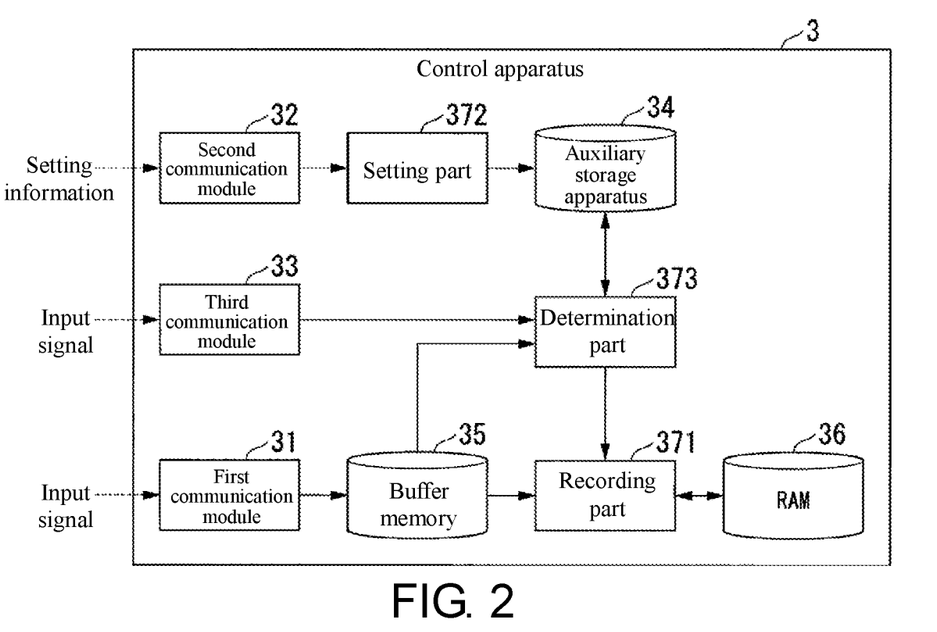
FIG. 2 is a block diagram showing a specific example of a functional configuration of a control apparatus 3.

FIG. 2 is a block diagram showing a specific example of the functional configuration of the control apparatus 3. The control apparatus 3 functions as an apparatus including a recording part 371, a setting part 372, and a determination part 373 through execution of the program performed by the processor 37. All or a part of functions of the control apparatus 3 may be realized by using hardware such as an ASIC (application specific integrated circuit), a PLD (programmable logic device), an FPGA, and the like. The program may be recorded in a computer readable recording medium. The computer readable recording medium is, for example, a movable medium such as a flexible disk, a magneto-optical disk, a ROM, a CD-ROM, and the like, or a storage apparatus such as a hard disk incorporated in a computer system. The program may be transmitted via an electric communication line.

The recording part 371 acquires the digital signal values stored in the buffer memory 35 and stores the acquired digital signal values in the RAM 36. Hereinafter, the operation in which the recording part 371 stores the digital signal values acquired from the buffer memory 35 in the RAM 36 is referred to as a recording operation. The recording part 371 starts the recording operation at a timing determined by the determination part 373. The recording part 371 ends the recording operation at a timing determined by the determination part 373. The processor 37 executes a predetermined process according to a user program, for example, after the recording operation of the recording part 371 is ended. For example, the processor 37 may record the digital signal values recorded in the RAM 36 by the recording part 371 to the auxiliary storage apparatus 34. For example, the processor 37 may execute a determination process by using the digital signal values recorded in the RAM 36 by the recording part 371 and a reference value recorded in advance in the auxiliary storage apparatus 34.

The setting part 372 registers various settings related to the operation of the control apparatus 3. More specifically, the setting part 372 communicates with the terminal apparatus 4 via the second communication module 32 and acquires information necessary for registering various settings from the terminal apparatus 4. The setting part 372 registers various settings for the control apparatus 3 by generating setting information based on the information acquired from the terminal apparatus 4 and storing the generated setting information in the auxiliary storage apparatus 34. If the setting information is registered in advance in the auxiliary storage apparatus 34, the setting part 372 may update the setting information based on the information acquired from the terminal apparatus 4.

For example, the setting part 372 receives from the terminal apparatus 4 information indicating a condition (hereinafter, referred to as a "recording start condition") at the time when the recording part 371 starts a recording operation and records the information in the auxiliary storage apparatus 34 as setting information. For example, the setting part 372 receives from the terminal apparatus 4 information indicating a condition (hereinafter, referred to as a "recording end condition") at the time when the recording part 371 ends the recording operation and records the information in the auxiliary storage apparatus 34 as setting information. There are a plurality of patterns of the recording start condition and the recording end condition that can be set in the setting part 372. From the plurality of patterns, the user can select a desired pattern corresponding to the control system 100 as the setting condition. In the following description, a configuration in which a user can select a desired pattern as the recording start condition and the recording end condition from the plurality of patterns is referred to as an "intelligent trigger".

The recording start condition may be set as a timing at which a digital value (hereinafter, referred to as a "first signal value") received by the first communication module 31 exceeds a predetermined threshold value, for example. In this case, the recording end condition may be set as a timing at which the first signal value drops below a predetermined threshold value, for example. The threshold value used in the recording start condition and the threshold value used in the recording end condition may be the same value or different values. Such a pattern is one of the conditions that may be selected as an intelligent trigger.

The recording start condition may be set as a timing at which a digital value (hereinafter, referred to as a "second signal value") received by the third communication module 33 satisfies a predetermined condition, for example. The recording end condition may be set as a timing at which the second signal value satisfies a predetermined condition, for example. More specifically, the recording start condition may be set as a timing at which the second signal value becomes a value indicating ON, for example. In this case, the recording end condition may be set as a timing at which the second signal value becomes a value indicating OFF. Such a pattern is one of the conditions that may be selected as an intelligent trigger.

The determination part 373 determines the timing at which the recording part 371 starts the recording operation and the timing at which the recording part 371 ends the recording operation based on the setting information set by the setting part 372.

Figure 3:
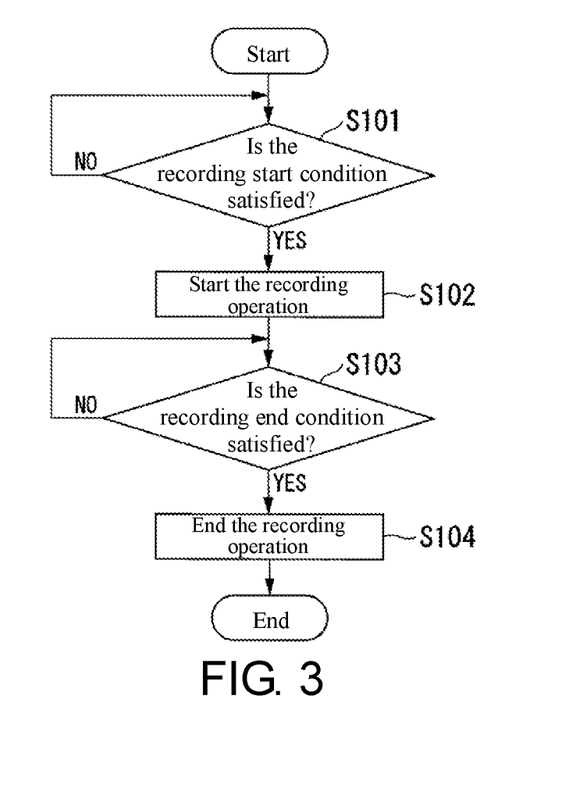
FIG. 3 is a flowchart showing an operation example of the control apparatus 3.

FIG. 3 is a flowchart showing an operation example of the control apparatus 3. The flowchart shown in FIG. 3 shows a flow of a process in which the control apparatus 3 starts a recording operation on digital signals sequentially acquired in the buffer memory 35 and a process of ending the recording operation.

First, in the control apparatus 3, the determination part 373 determines whether the recording start condition is satisfied based on the setting information stored in the auxiliary storage apparatus 34 (step S101). If the recording start condition is not satisfied (step S101—NO), the determination part 373 does not determine the start of the recording operation. On the other hand, if the recording start condition is satisfied (step S101—YES), the determination part 373 determines the start of the recording operation. According to the determination of the determination part 373, the recording part 371 starts the recording operation (step S102). When the recording operation is started, the determination part 373 determines whether the recording end condition is satisfied (step S103). If the recording end condition is not satisfied (step S103—NO), the determination part 373 does not determine the end of the recording operation. In this case, the recording part 371 continues the recording operation. On the other hand, if the recording start condition is satisfied (step S103—YES), the determination part 373 determines the end of the recording operation. According to the determination of the determination part 373, the recording part 371 ends the recording operation (step S104).

First Application Example

Figure 4:
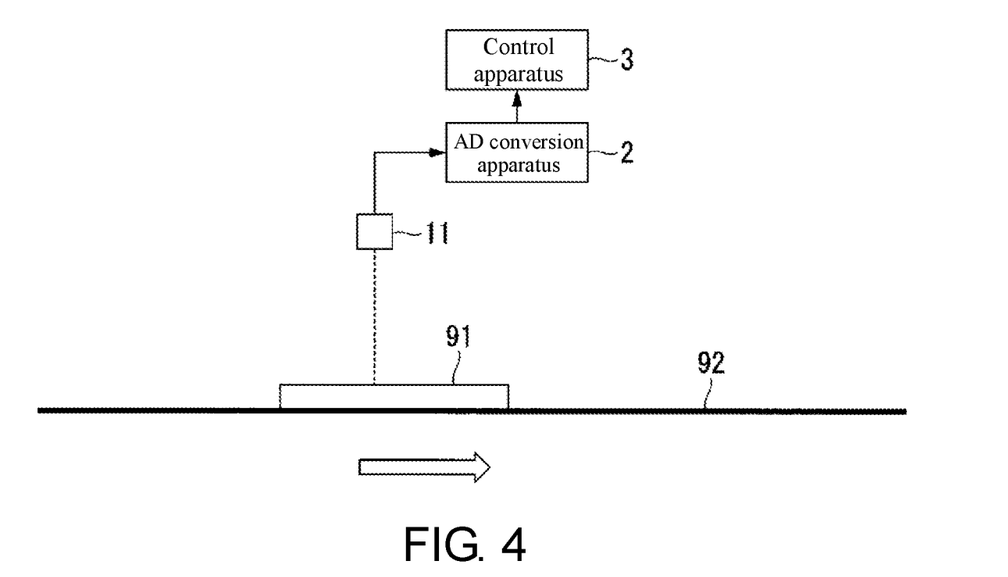
FIG. 4 is a diagram showing a configuration of a first application example of an intelligent trigger that may be selected in the control system 100.

FIG. 4 is a diagram showing a configuration of a first application example of an intelligent trigger that may be selected in the control system 100. In the first application example, the determination part 373 determines the recording start condition and the recording end condition based on the first signal value without using the second signal value. In the first application example, a target object 91, which is an object to be sensed by the first device 11, is conveyed from the left to the right by a conveyance body 92. The first device 11 may be, for example, a distance sensor. In this case, the first device 11 outputs to the AD conversion apparatus 2 an electric signal indicating an analog value corresponding to the distance from the position where the first device 11 is installed to the upper surface of the target object 91. The AD conversion apparatus 2 converts the electric signal indicating the analog value into an electric signal indicating a digital value and outputs it to the control apparatus 3. The control apparatus 3 acquires the digital value output from the AD conversion apparatus 2 as the first signal value.

Figure 5:
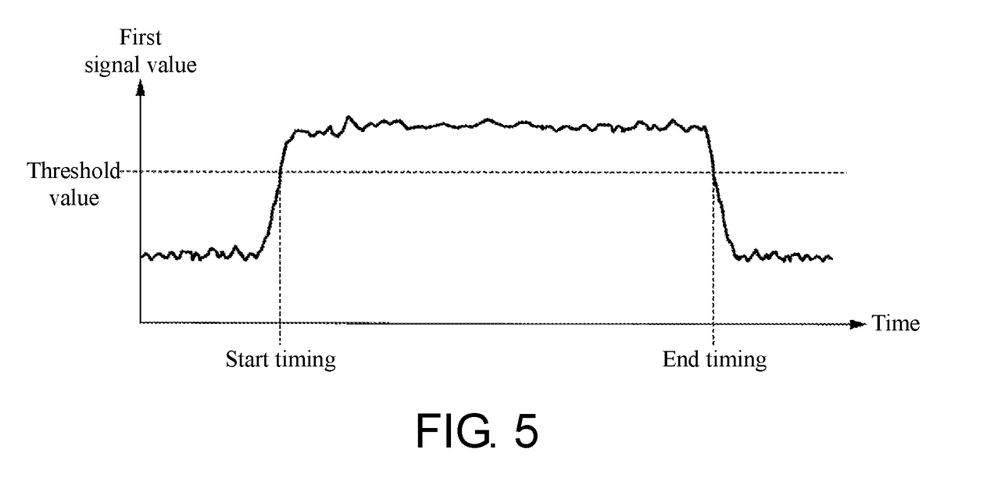
FIG. 5 is a diagram showing a specific example of a signal waveform showing a time series change of a first signal value in the first application example.

FIG. 5 is a diagram showing a specific example of a signal waveform showing a time series change of the first signal value in the first application example. In the first application example, predetermined threshold values are preset as the recording start condition and the recording end condition. The determination part 373 determines the timing at which the first signal value exceeds the preset predetermined threshold value as a start timing. The determination part 373 determines the timing at which the first signal value drops below the preset predetermined threshold value as an end timing. The recording part 371 records the first signal value between the start timing and the end timing. In the first application example, the predetermined threshold value at the start timing and the predetermined threshold value at the end timing may be the same value or different values.

Second Application Example

Figure 6:
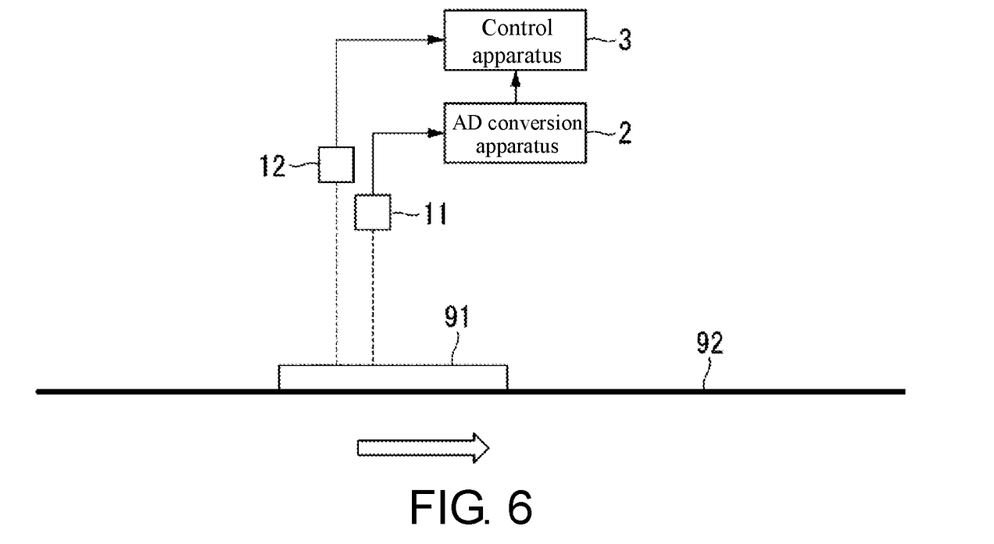
FIG. 6 is a diagram showing a configuration of a second application example of the intelligent trigger that may be selected in the control system 100.

FIG. 6 is a diagram showing a configuration of a second application example of the intelligent trigger that may be selected in the control system 100. In the second application example, the determination part 373 determines the recording start condition and the recording end condition based on the first signal value and the second signal value. Similarly, in the second application example, the target object 91, which is an object to be sensed by the first device 11, is conveyed from the left to the right by the conveyance body 92. Since the configurations of the first device 11 and the AD conversion apparatus 2 are the same as those of the first application example, description thereof is omitted. The second device 12 detects the presence of the target object 91 at a position substantially the same as the position of the surface of the target object 91 sensed by the first device 11. The second device 12 may be provided in the vicinity of the first device 11, for example. The second device 12 may be, for example, a sensor such as any of various displacement sensors or various ON/OFF sensors. The various displacement sensors are generally analog output sensors. The various ON/OFF sensors are generally digital output sensors. However, the second device 12 is not limited to such a sensor.

Figure 7:
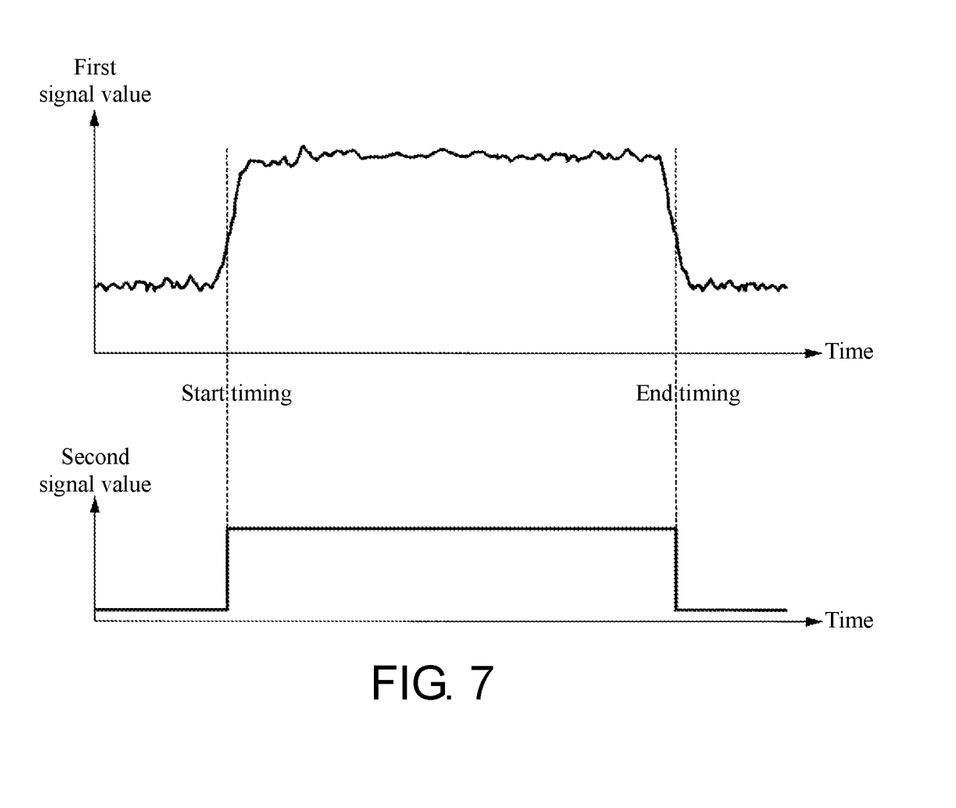
FIG. 7 is a diagram showing a specific example of a signal waveform showing a time series change of a first signal value and a second signal value in the second application example.

FIG. 7 is a diagram showing a specific example of a signal waveform showing a time series change of the first signal value and the second signal value in the second application example. In the second application example, the timing at which the second signal value becomes a value indicating ON is determined as a start timing. The determination part 373 determines the timing at which the second signal value becomes a value indicating OFF as an end timing. The recording part 371 records the first signal value between the start timing and the end timing.

Third Application Example

Figure 8:
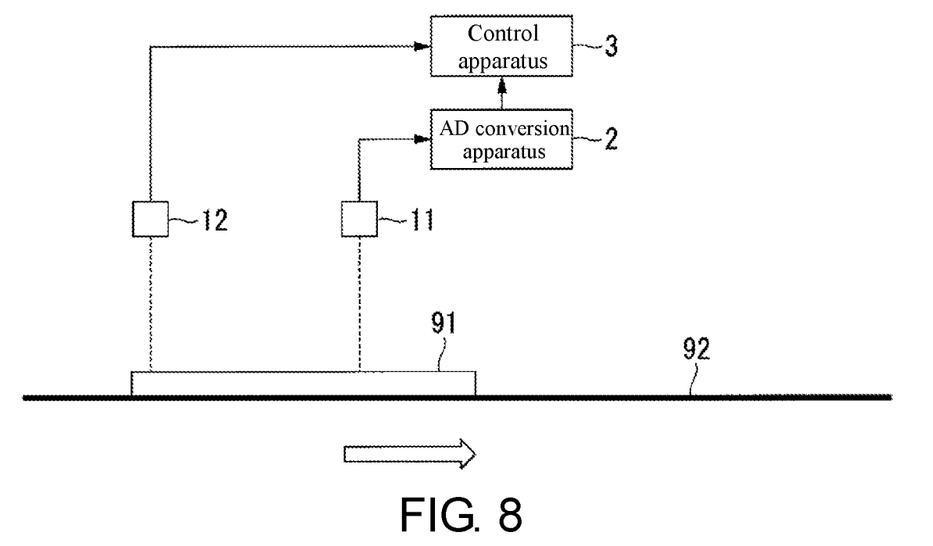
FIG. 8 is a diagram showing a configuration of a third application example of the intelligent trigger that may be selected in the control system 100.

FIG. 8 is a diagram showing a configuration of a third application example of the intelligent trigger that may be selected in the control system 100. In the third application example, the determination part 373 determines the recording start condition and the recording end condition based on the first signal value and the second signal value. Similarly, in the second application example, the target object 91, which is an object to be sensed by the first device 11, is conveyed from the left to the right by the conveyance body 92. Since the configurations of the first device 11 and the AD conversion apparatus 2 are the same as those of the first application example, description thereof is omitted. The second device 12 detects the presence of the target object 91 at a position on the upstream side (left side) of the position of the surface of the target object 91 sensed by the first device 11. The second device 12 may be, for example, a sensor such as any of various displacement sensors or various ON/OFF sensors. The various displacement sensors are generally analog output sensors. The various ON/OFF sensors are generally digital output sensors. However, the second device 12 is not limited to such a sensor.

Figure 9:
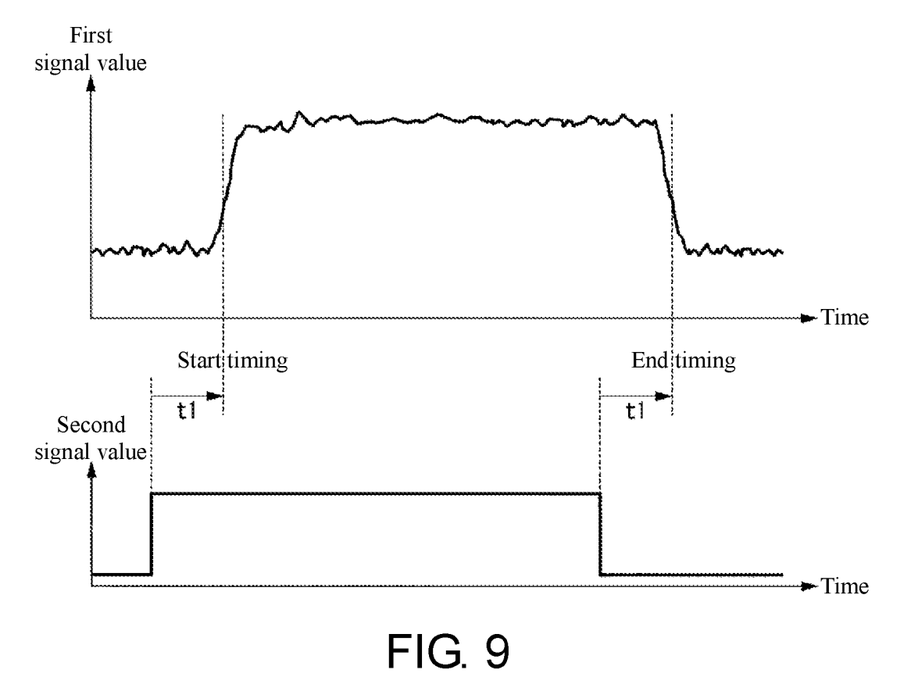
FIG. 9 is a diagram showing a specific example of a signal waveform showing a time series change of a first signal value and a second signal value in the third application example.

FIG. 9 is a diagram showing a specific example of a signal waveform showing a time series change of the first signal value and the second signal value in the third application example. In the third application example, the timing at which a predetermined time t1 has elapsed from the timing at which the second signal value becomes a value indicating ON is determined as a start timing. The determination part 373 determines the timing at which the predetermined time t1 has elapsed from the timing at which the second signal value becomes a value indicating OFF as an end timing. The recording part 371 records the first signal value between the start timing and the end timing. In the third application example, the predetermined time t1 at the start timing and the predetermined time t1 at the end timing may be the same value or different values.

Fourth Application Example

Next, the fourth application example will be described. Since the configuration in the fourth application example is the same as that in the third application example, illustration and description are omitted.

Figure 10:
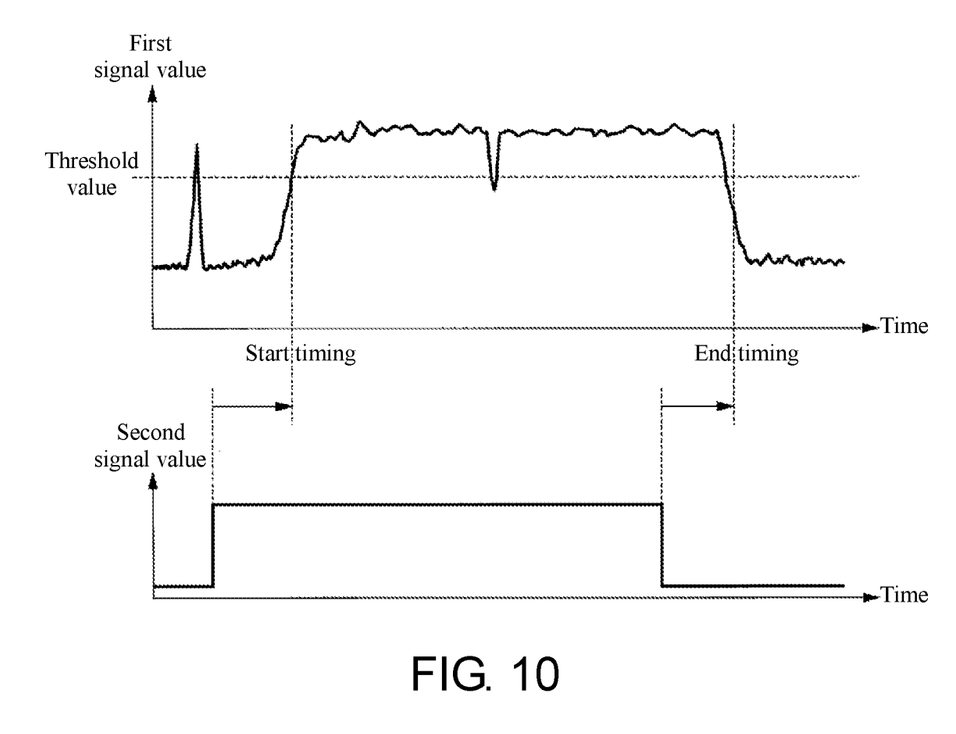
FIG. 10 is a diagram showing a specific example of a signal waveform showing a time series change of a first signal value and a second signal value in the fourth application example.

FIG. 10 is a diagram showing a specific example of a signal waveform showing a time series change of the first signal value and the second signal value in the fourth application example. In the fourth application example, the timing at which the first signal value exceeds a preset predetermined threshold value after the timing at which the second signal value becomes a value indicating ON is determined as a start timing. The determination part 373 determines the timing at which the first signal value drops below a preset predetermined threshold value after the timing at which the second signal value becomes a value indicating OFF as an end timing. The recording part 371 records the first signal value between the start timing and the end timing. In the fourth application example, the predetermined threshold value at the start timing and the predetermined threshold value at the end timing may be the same value or different values.

In the control system 100 configured as described above, it is possible to select from a plurality of patterns the condition for starting the recording operation and the condition for ending the recording operation of the signal. Therefore, more appropriate conditions can be easily set according to the user's requirements, the configuration of the control system 100, the device to be controlled by the control system 100, and the like.

In the first application example, the start timing and the end timing are determined based on a preset threshold value. Therefore, it is possible to appropriately record the first signal value according to the rising and falling timings of the first signal value. By using the signal recorded in this way as the target of processing, it is possible to avoid using a signal having a value that will be excluded from processing, so that it is possible to perform processing with higher accuracy.

In the second application example, the start timing and the end timing are determined based on the second signal value (so-called external trigger). Therefore, even if the signal to be processed cannot be acquired accurately only with the value of the first signal value, it is possible to appropriately record the first signal value based on the second signal value. Thus, by using the signal recorded based on the second signal value as the target of processing, it is possible to avoid using a signal having a value that will be excluded from processing, so that it is possible to perform processing with higher accuracy. For example, when the second signal value is the output value of the sensor that detects the presence of the target object 91, since it is possible to avoid using the first signal value in the state where the target object 91 is not present in the first place for processing, it is possible to perform processing with higher accuracy.

In the third application example, the start timing and the end timing are determined based on the timing at which a predetermined time has elapsed since the value of the second signal value (so-called external trigger) changed. Therefore, even if the timing at which the target object 91 is located in the sensing area of the first device 11 and the timing at which the second device 12 detects the target object 91 are not synchronized with each other, it is possible to appropriately record the first signal value based on the second signal value. Similarly, in the third application example, it is possible to obtain the same effect as that in the second application example. Also, in the third application example, the condition for installing the second device 12 is flexible as compared with the second application example. Therefore, it is possible to design with a higher degree of freedom.

In the fourth application example, the start timing or the end timing is determined based on the timing at which the first signal value exceeds a predetermined threshold value or the timing at which the first signal value drops below the predetermined threshold value after the value of the second signal value (so-called external trigger) changed. Therefore, as shown in FIG. 10, even in an environment where large noise occurs such that the first signal value exceeds or drops below the threshold value, it is possible to appropriately record the first signal value based on the second signal value. Similarly, in the fourth application example, it is possible to obtain the same effect as that in the second application example or the third application example. Further, in the fourth application example, compared with the second application example or the third application example, it is possible to improve robustness against noise of the first signal value for the reason described above.

Modified Example

The first application example to the fourth application example may be combined as appropriate. For example, the recording start condition and the recording end condition may be implemented based on different application examples. The end timing is not limited to those described above. For example, in the first application example, the second application example, the third application example, and the fourth application example, the end timing may be defined as the timing at which a predetermined amount of the first signal value has been recorded after the start timing or may be defined as the timing at which a time of a predetermined length has elapsed since the start timing.

Figure 11:
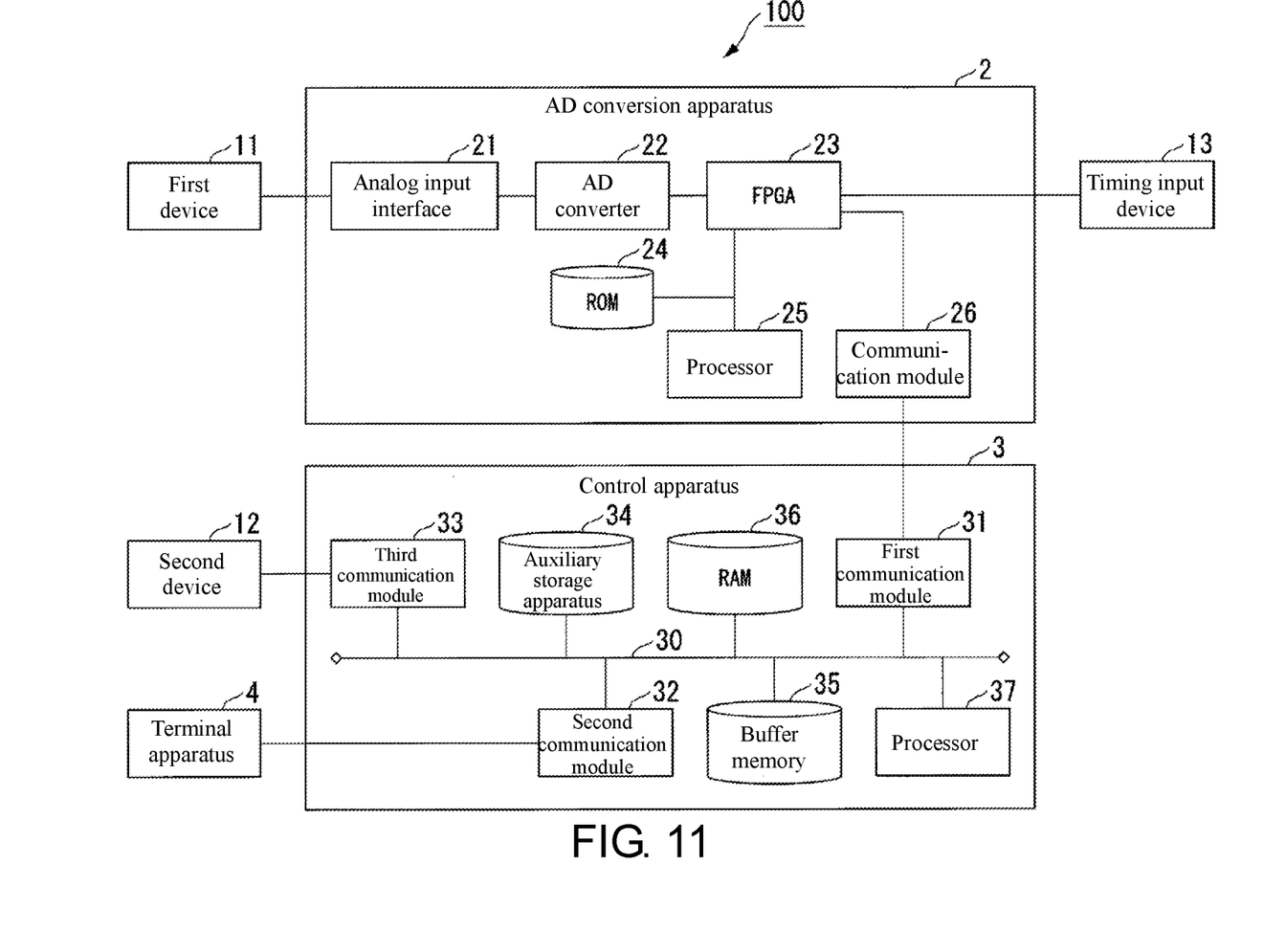
FIG. 11 is a diagram showing a configuration of a modified example of the control system 100.

FIG. 11 is a diagram showing a configuration of a modified example of the control system 100. As shown in FIG. 11, in the control system 100, a timing input device 13 may be connected to the AD conversion apparatus 2. The timing input device 13 is, for example, a timing sensor or a mechanical switch. The timing input device 13 detects the presence of a target object in a predetermined area. The timing input device 13 outputs a digital signal (an ON signal or OFF signal) indicating the detection result to the AD conversion apparatus 2. The AD conversion apparatus 2 outputs the digital signal output from the timing input device 13 to the control apparatus 3. The digital signal output by the timing input device 13 may be used in the control apparatus 3 to determine the timing of starting the recording operation on the digital signal related to the target object. In other words, the determination part 373 of the control apparatus 3 may determine the timing of starting or ending the recording operation based on the digital signal output from the timing input device 13.

Figure 12:
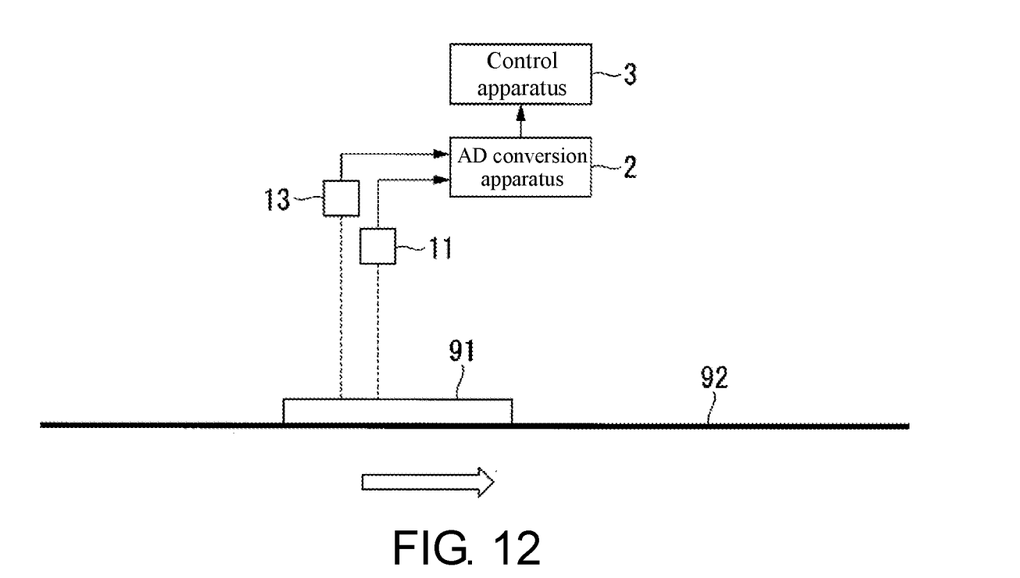
FIG. 12 is a diagram showing a configuration of the second application example of the intelligent trigger in the modified example of the control system 100.
Figure 13:
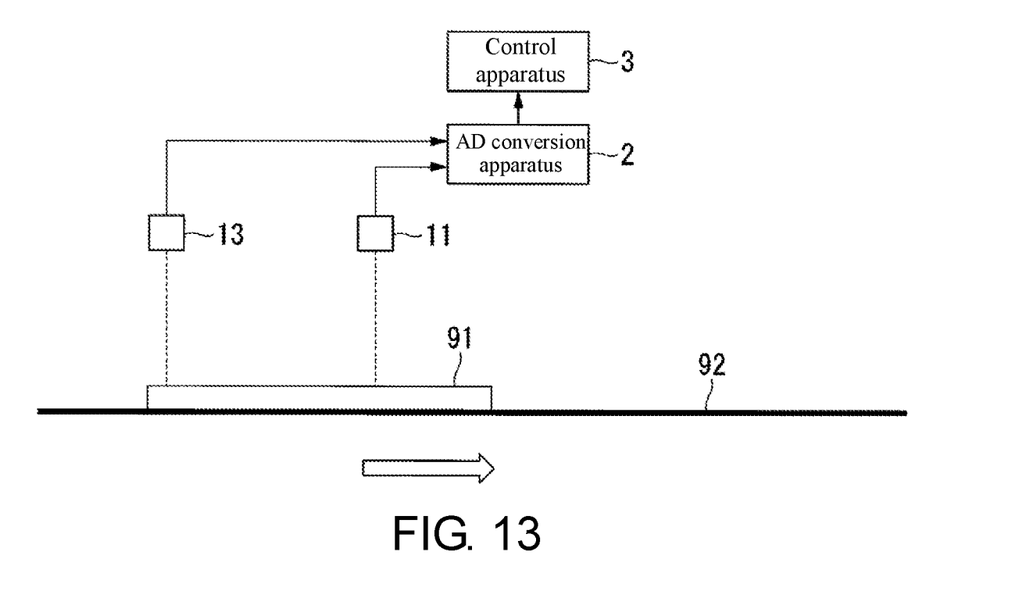
FIG. 13 is a diagram showing a configuration of the third application example of the intelligent trigger in the modified example of the control system 100.

FIG. 12 is a diagram showing a configuration of the second application example of the intelligent trigger in the modified example of the control system 100. FIG. 13 is a diagram showing a configuration of the third application example of the intelligent trigger in the modified example of the control system 100. In the configuration shown in FIG. 12, the timing input device 13, instead of the second device 12, is connected to the AD conversion apparatus 2 in the configuration of the second application example shown in FIG. 6. In the configuration shown in FIG. 13, the timing input device 13, instead of the second device 12, is connected to the AD conversion apparatus 2 in the configuration of the third application example shown in FIG. 8. In either configuration, the same function and effect as those of the second application example and the third application example can be obtained, respectively.

Although the embodiments of the disclosure have been described in detail with reference to the drawings, the specific configurations are not limited to the embodiments, and designs and the like that fall within the scope without deviating from the gist of the disclosure are also included in the disclosure.

What is claimed is:

1. A control apparatus, comprising:
   a first interface acquiring a first signal of a time series output from a first device;
   a controller recording a part of the first signal acquired by the first interface, and the controller determining a timing at which the controller records the first signal based on a preset predetermined condition; and
   a second interface acquiring a second signal output from a second device different from the first device,
   wherein the controller determines a timing at which the controller starts recording the first signal based on the second signal acquired by the second interface,
   wherein the controller determines the timing at which the controller starts recording the first signal based on a timing at which the first signal satisfies the predetermined condition after the second signal acquired by the second interface satisfies another predetermined condition,
   wherein the another predetermined condition comprises that the second signal changes from a first state to a second state.

2. The control apparatus according to claim 1, wherein the controller determines a timing at which the controller starts recording the first signal based on a timing at which a value of the first signal acquired by the first interface exceeds a predetermined threshold value.

3. A control method, comprising:
   acquiring a first signal of a time series output from a first device;
   determining a timing of recording the first signal based on a preset predetermined condition;
   recording a part of the first signal acquired in the step of acquiring the first signal of the time series output from the first device according to the timing determined in the step of determining the timing of recording the first signal based on the preset predetermined condition;
   acquiring a second signal output from a second device different from the first device;
   determining a timing at which starting recording the first signal based on the second signal; and
   determining the timing at which starting recording the first signal based on the timing at which the first signal satisfies the predetermined condition after the second signal acquired satisfies another predetermined condition,
   wherein the another predetermined condition comprises that the second signal changes from a first state to a second state.

* * * * *